Patented Feb. 13, 1923.

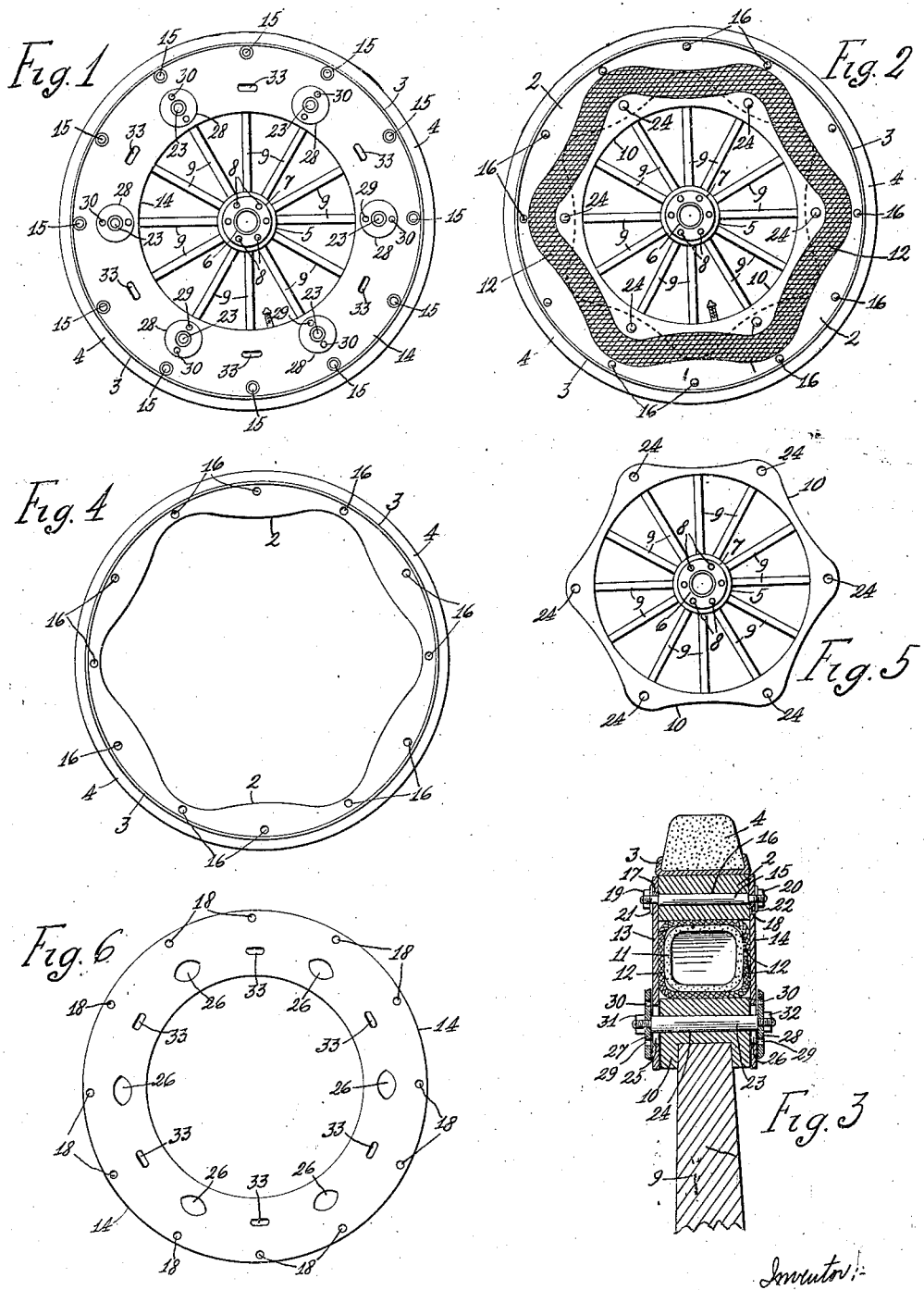

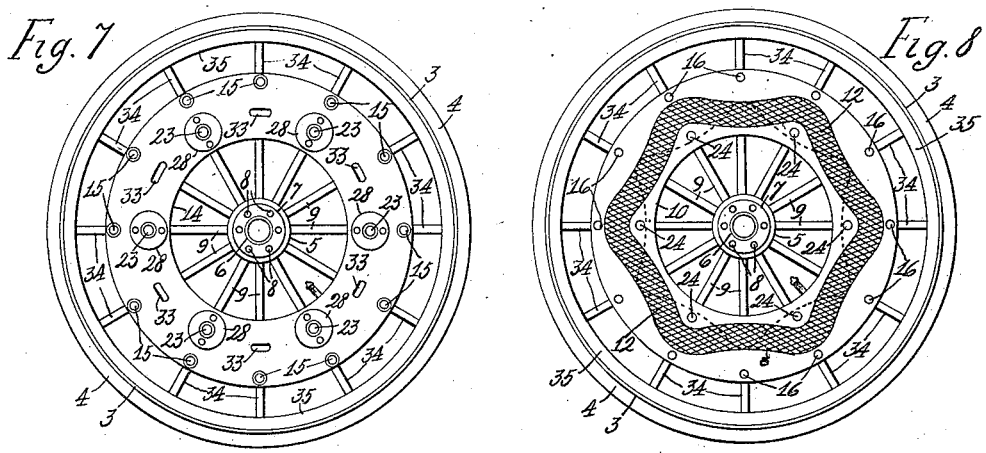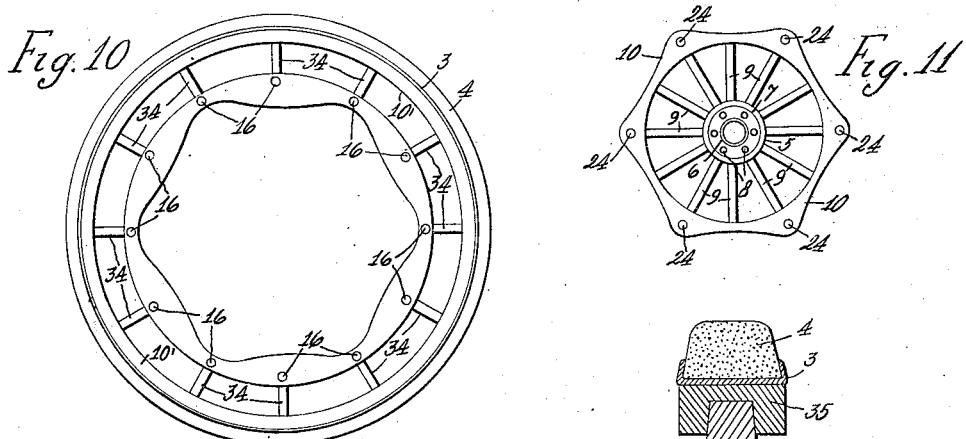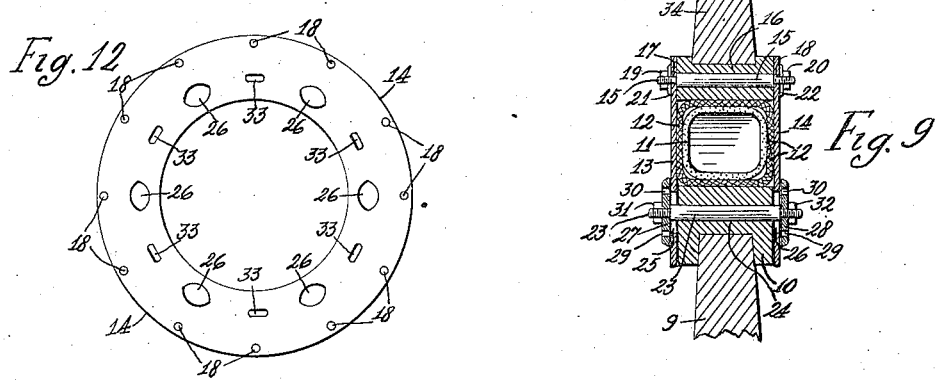

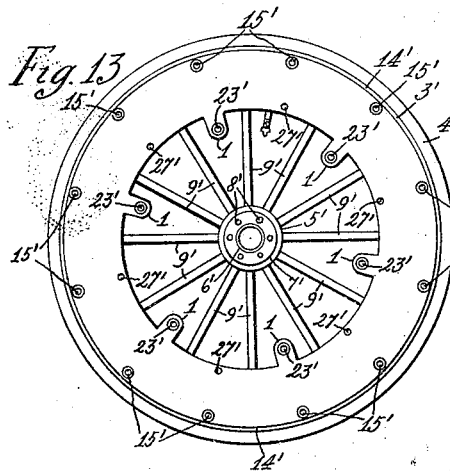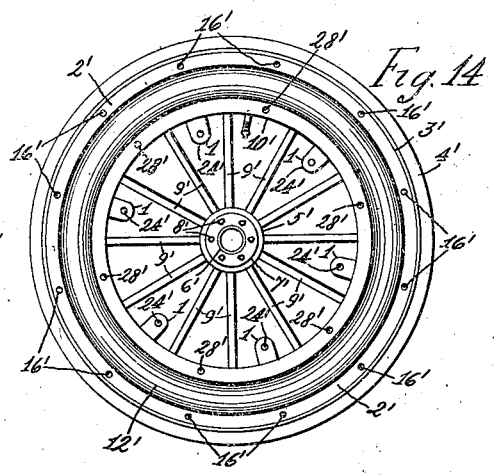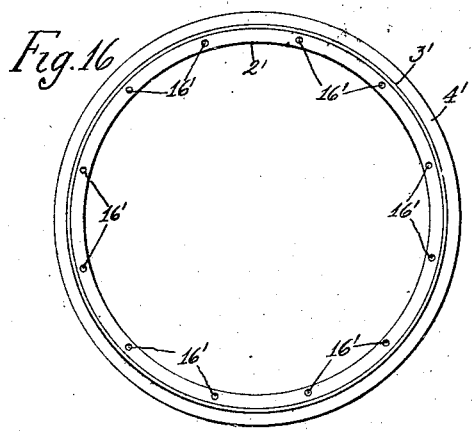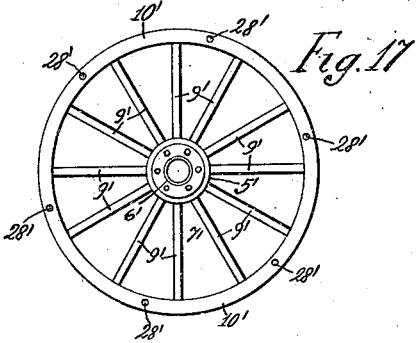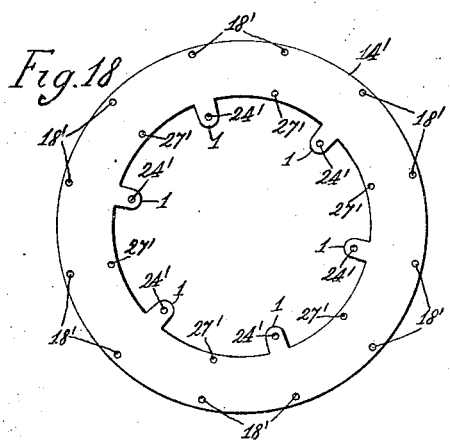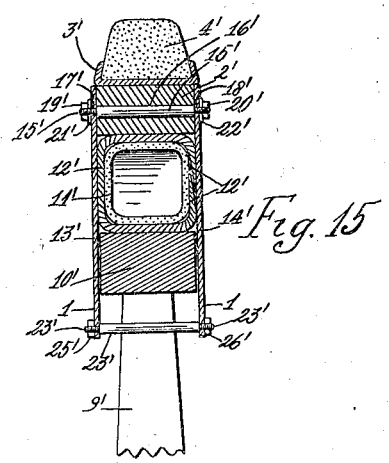

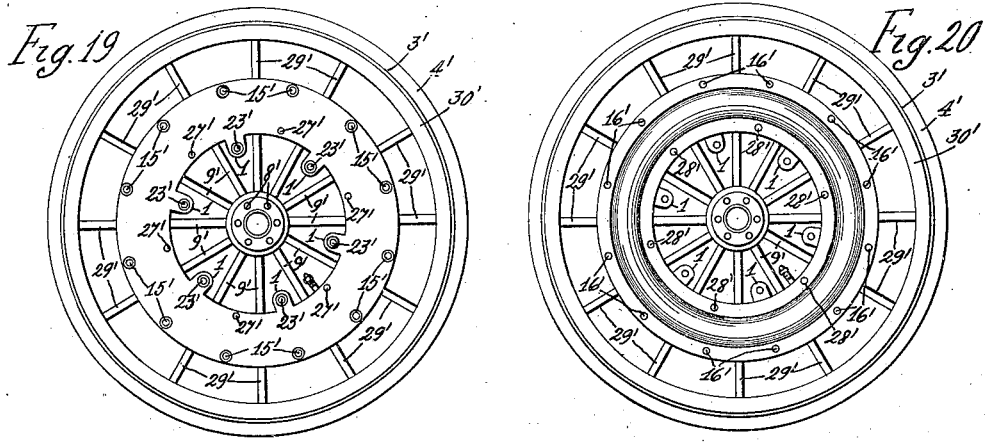
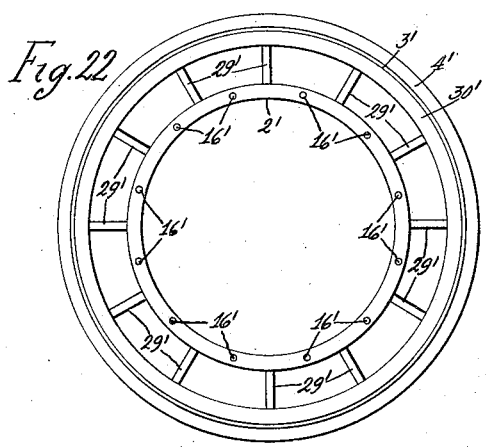
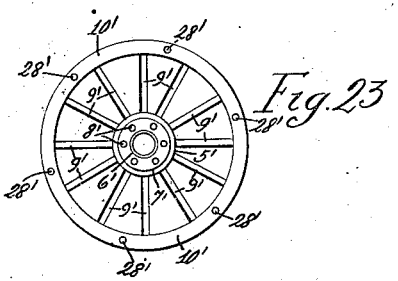
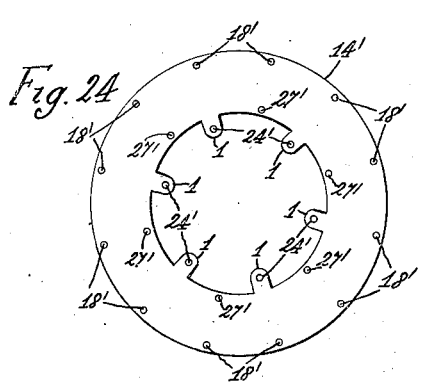
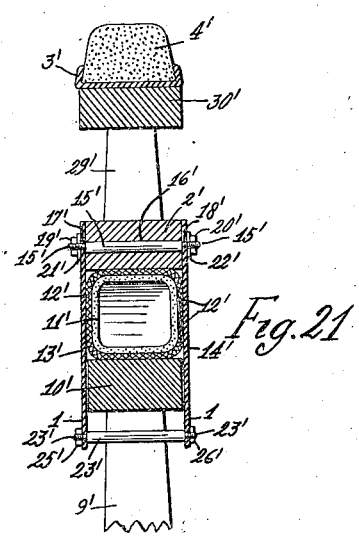

1,445,164

UNITED STATES PATENT OFFICE.

VICENTE PAZ, OF HABANA, CUBA.

VEHICLE WHEEL.

Application filed June 20, 1919. Serial No. 305,585.

*To all whom it may concern:*

Be it known that I, VICENTE PAZ, a subject of the King of Spain, and a resident of Habana, Cuba, have invented certain new and useful Improvements in Vehicle Wheels, of which the following is a specification.

This invention relates to vehicle wheels and one of its objects is to provide an inner pneumatic tube between two detachable members in such a manner that the pneumating tube will be really protected and prevented from being punched by any outer puncturing object, and also be easily removed.

Another object of this invention is to provide the pneumatic tube with an outer wrapper of flexible material which prevents its friction upon hard surfaces such as are those shown on the metallic or wooden rims, this preventing its pinching and the subsequent puncturing or punching thereof.

A further object is to allow a limited sliding motion between the members of the wheel, so as to not hinder excessively with the proper function of the wheel.

And still a further object of this invention is to obtain a firm and rigid connection of the members of the wheel when the pneumatic tube has been destroyed by the wear, the wheel forming thereby a rigid unit.

In the annexed drawings:

Fig. 1 is an outer elevation of a vehicle traction wheel provided with the improvements forming the subject matter of this invention.

Fig. 2 is a similar view with one of the side plates removed.

Fig. 3 is an enlarged diametrical partial section of said wheel.

Fig. 4 is an elevation of the outer member of said wheel.

Fig. 5 is an elevation of the inner member of said wheel.

Fig. 6 is an elevation of one of the plates laterally covering the pneumatic tube.

Fig. 7 is an outer elevation of a modified form of vehicle traction wheel, constructed according to this invention.

Fig. 8 is a similar view to that of Fig. 7, one of the side plates covering the pneumatic tube having been removed.

Fig. 9 is an enlarged diametrical partial section of this modified form of wheel.

Fig. 10 is an elevation of the outer member of this modified form of wheel

Fig. 11 is an elevation of the inner member of this modified form of wheel.

Fig. 12 is an elevation of one of the plates laterally covering the pneumatic tube in this modified form of wheel.

Fig. 13 is an outer elevation of a vehicle idle wheel provided with the improvements forming the subject-matter of this invention.

Fig. 14 is a view similar to that of Fig. 13, one of the side plates covering the pneumatic tube having been removed.

Fig. 15 is an enlarged diametrical partial section of this idle wheel.

Fig. 16 is an elevation of the outer member of this idle wheel.

Fig. 17 is an elevation of the inner member of this idle wheel.

Fig. 18 is an elevation of one of the side plates covering the pneumatic tube.

Fig. 19 is an outer elevation of a modified form of vehicle idle wheel, constructed according to this invention.

Fig. 20 is a similar view to that of Fig. 19, one of the side plates covering the pneumatic tube having been removed.

Fig. 21 is an enlarged diametrical partial section of this modified form of idle wheel.

Fig. 22 is an elevation of the outer member of this modified form of idle wheel.

Fig. 23 is an elevation of the inner member of this modified form of idle wheel.

And Fig. 24 is an elevation of one of the side plates covering the pneumatic tube in this modified form of idle wheel.

This wheel comprises two members, an outer or peripheral member and an inner or hub member which have a movement of limited extension between each other, and between them is lodged a pneumatic tube which is covered with a wrapper opened and folded which is made of fabric and rubber, so as to prevent the direct friction of the pneumatic tube with the outer and inner members, and the pneumatic tube and its wrapper are laterally covered by two annular plates connected together by means of two series of screws passing respectively through the outer and inner members, thus permitting a sliding movement of the inner member with respect to the outer member and pneumatic tube in two directions, a radial one and a peripheral one.

In Figs. 1, 2, 3, 4, 5 and 6 is shown a vehicle traction wheel which is formed of an outer member consisting of a metallic or wooden felloe 10 whose outer periphery is circular in shape and its inner periphery presents a plurality of convexed or inwardly projecting arches, preferably six in number as shown, in alternative relation with a similar number of concave or outwardly projecting arches constituting a regular figure, and on the outer periphery of felloe 2 is fitted a channelled wheel rim 3 holding inside thereof a solid rubber tire 4. The inner member of this traction wheel is constituted by a hub 5 provided with the bushing 6 and guarded with the plates 7 which are secured thereto by means of screws passing through the holes 8 and from hub 5 lead a plurality of spokes 9 which bear at their end a metallic or wooden felloe 10 whose inner periphery is circular in shape and its outer periphery has a concentric shape with the inner periphery of felloe 2, that is, formed by six inwardly projecting curves in alternative relation with six outwardly projecting curves, the inner felloe 10 being spaced apart from the outer one 2 so as to leave between each other an intermediate space which is occupied by a pneumatic tube 11 having a concentric form in respect to that of the two felloes, that is, forming six inwardly projecting arches, alternated with six outwardly projecting arches, the inwardly projecting arches being generally longer and of less curvature and the outwardly projecting arches of the pneumatic tube being shorter and of more curvature, and the arches of the inner and outer peripheries respectively of the outer and inner felloes are in a corresponding relation with the object in view of securing a most firm grip between the pneumatic and the felloes, and the pneumatic 11 is coated with a fabric and rubber wrapper 12 which is plain or opened and is folded in cylindrical form, as shown in Fig. 3, on the pneumatic 11, its beveled edges being superposed. The space between the two felloes 2 and 10 is closed by annular plates 13 and 14, one at each side, which bear against the side faces of the felloes and are secured thereto by means of two series of bolt screws, viz: twelve screws of reduced and threaded ends 15 passing through equidistant holes 16 in the outer felloe 2 and through similarly arranged holes 17 and 18 in plates 13 and 14, these screws being tightened against felloe 2 by means of nuts 19 and 20 screwed on the threaded ends of said screws 15 against washers 21 and 22, and the union is completed by means of six screws of reduced and threaded ends 23 passing through equidistant holes 24 in the arcuate projecting portions of the inner felloe 10 and through elongated and widened or of almost elliptical shape openings 25 and 26 formed in the plates 13 and 14 and radially corresponding with six alternative holes 17 and 18 on the same plates, said six screws being tightened against the inner felloe 10 by means of threaded washers 27 and 28 which are screwed by means of compass keys whose points fit in the holes 29 and 30 diametrally opposite thereto and by means of nuts 31 and 32 which are also screwed on the threaded ends of said screws 23, and in circular alinement with the elliptical openings 25 and 26 and radially corresponding with the other six alternative holes 17 and 18 are arranged arched grooves 33 which are designed for receiving the same screws 23 when the pneumatic 11 has been destroyed by wear, in which case the outer element of the wheel is moved with respect to the inner element, after having taken off the screws 23, until the outwardly projecting portions of the inner felloe 10 come in contact with the inwardly projecting portions of outer felloe 2 as indicated with dotted lines in Fig. 2 of the drawings, the wheel being thus centered and in condition to continue running without receiving the same screws 23 when the pneumatic 11.

In the operation of the wheel, the elliptical openings 25 and 26 of plates 13 and 14 permit a radial movement of the inner and outer members with respect to each other, the pneumatic tube 11 acting as a cushion, and also said openings allow a peripheral movement of both elements when starting, the treading motion thereby produced being merely a friction of limited extension between both members and the pneumatic tube which is received by wrapper 12.

In order to replace the pneumatic tube 11 when it is so required, the nuts 19 and 31 and the washers 21 and 27 at the outer side of the wheel are removed and the outer plate 14 is separated therefrom whereby wrapper 12 becomes uncovered and the same is taken out together with pneumatic 11 and a new pneumatic is inserted in place, thereupon plate 14 is again placed and secured with the nuts 19 and 31 and washers 21 and 27 that were previously taken off.

In Figs. 7, 8, 9, 10 and 11 is shown a modified form of traction wheel in which the inner member (Fig. 11) is similar but of less radius than in the form of wheel illustrated in Figs. 1, 2 and 3, while the outer member (Fig. 10) has the felloe 10 of the same form but of less radius than in the form of wheel illustrated in Figs. 1, 2 and 3, and the wheel rim is spaced apart from the felloe 10 by a plurality of spokes 28. Plates 13 and 14 (Fig. 12) are also of less radius than in the wheel shown in Figs. 1, 2 and 3. Therefore, the result is that the curves are of less radius or most closed, whereby the pneumatic tube is adapted to follow better the evolutions of the wheel. In all other respects the operation of this modified form of wheel is similar to that of the wheel shown in Figs. 1, 2 and 3 of the drawings.

In Figures 13, 14 and 15 is illustrated a vehicle idle wheel or front wheel in which the outer member is constituted by a felloe 2' whose outer and inner peripheries are circular in shape and on its outer periphery is fitted the channelled wheel rim 3' bearing the solid tire 4', and the inner member is composed of the hub 5' provided with the bushing 6' and guarded by the plates 7' which are secured thereto by means of screws passing through holes 8' and from hub 5' lead the spokes 9' beating at its end a felloe 10' whose inner and outer peripheries are circular in shape, the two felloes 2, and 10' being separated from one another and the space between the same is occupied by a pneumatic tube 11' of circular form which is coated by the fabric and rubber wrapper 12' which is plain or opened and is folded in cylindrical manner, one of its beveled edges being superposed to the other one. The space between the two felloes 2' and 10' is closed by means of two annular plates 13' and 14', each one of which presents a plurality of radial lugs 1 projecting inwardly from its inner edge and which are equally spaced apart, and said plates bear against the side faces of felloes 2' and 10' and are secured thereto by means of two series of bolt screws, to wit: twelve screws of reduced and threaded ends 15' passing through holes equally spaced apart 16' in the outer felloe 2' and of holes similarly arranged 17' and 18' in plates 13' and 14', six of these holes 17' and 18' corresponding radially with lugs 1, and the other six holes 17' and 18' being intermediate, and the plates 13' and 14' are tightened against felloe 2' by means of the nuts 19' and 20' screwed on the threaded ends of said screws 15' against washers 21' and 22' and the union is completed by means of six screws 23' having their ends reduced and threaded and passing through holes 24' in lugs 1 and on whose threaded ends are screwed nuts 25' and 26'. Holes 16' of outer felloe 2' are so arranged as to correspond radially with the spaces between the spokes 9', and in this manner lugs 1 will remain within these same spaces. Alternatively with lugs 1 the plates 13' and 14' present adjacent its inner edge six holes 27' and corresponding with these holes there are provided in felloe 10' six holes 28', these holes 27' and 28' serving to receive bolt-screws for centering the wheel when the pneumatic 11' has become useless. The wheel so constructed affords two movements between the outer and the inner members, to wit: a movement in a radial direction which is determined by the distance between the bolt screws 23' and the inner periphery of the inner felloe 10', and the other in circular direction which is determined by the distance between one of lugs 1 and the adjacent spoke 8' of the inner member.

To change the pneumatic 11' when it is so desired, the same operation is followed as that described for the two forms of traction wheels previously described, it only being necessary to take off the nuts 19' and 25' and washers 21' separating the outer plate 13' and to place them again once the new pneumatic and its wrapper 12' have been placed between the two felloes 2' and 10'.

In Figs. 19, 20 and 21, is illustrated a modified form of vehicle front or idle wheel in which the inner member (Fig. 23) is similar but of less radius than in the form of wheel shown in Figures 13, 14 and 15, while the outer member (Fig. 22) presents the felloe 10' of the same form but of less radius than in the form of wheel illustrated in Figs. 13, 14 and 15, and the wheel rim 3' is spaced apart from felloe 10' by a plurality of spokes 29'. Plates 13' and 14' (Fig. 24) are also of less radius than in the wheel shown in Figs. 13, 14 and 15. This form of wheel results more economical in view of the fact that the pneumatic 11' is located more to the center of the wheel and is accordingly of less length at its periphery.

It is obvious that the details of construction of the wheel can be slightly varied without altering the spirit of the invention, which is as pointed out in the following claims:

What I claim is:

In a vehicle wheel, the combination of an outer member, an inner member spaced apart from the first member, a pneumatic tube detachably lodged in the space between both outer and inner members, side annular plates laterally covering the pneumatic tube, a plurality of receiving devices passing through holes in the outer member and in the plates to rigidly connect the same and a plurality of receiving devices passing through holes in the inner member and through elliptical shaped openings in the plates to removably connect the inner member and the plates, and which are secured with circular washers which are of greater diameter than the longitudinal size of said openings, thus permitting two movements of limited extension of the inner member with respect to the outer member, being one movement in radial direction and another in peripheral direction, the inner member and the plates being provided with holes arranged for receiving devices to rigidly connect the inner member to the plates in a concentric relation when the pneumatic tube is removed.

In witness whereof I affix my signature.

VICENTE PAZ.